United States Patent
Chambo et al.

(10) Patent No.: US 8,616,944 B2
(45) Date of Patent: Dec. 31, 2013

(54) PRESSURE RELIEF VALVE FOR A VEHICLE BODY

(75) Inventors: Kimberly A. Chambo, Livonia, MI (US); Marc J. Tahnoose, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 883 days.

(21) Appl. No.: 12/554,098

(22) Filed: Sep. 4, 2009

(65) Prior Publication Data

US 2011/0056569 A1    Mar. 10, 2011

(51) Int. Cl.
  *B60H 1/24*    (2006.01)
(52) U.S. Cl.
  USPC .............................. 454/162; 454/164; 454/259
(58) Field of Classification Search
  USPC ........... 454/70, 162, 164, 165, 227, 238, 255, 454/340, 353, 359, 259; 137/849, 859
  See application file for complete search history.

(56) References Cited

U.S. PATENT DOCUMENTS

| | | | | |
|---|---|---|---|---|
| 5,592,966 A | * | 1/1997 | Gates | 137/513.5 |
| 5,803,121 A | * | 9/1998 | Estes | 137/849 |
| 5,890,959 A | * | 4/1999 | Pettit et al. | 454/184 |
| 6,035,896 A | * | 3/2000 | Liardet | 137/849 |
| 6,186,886 B1 | * | 2/2001 | Farrington et al. | 454/141 |
| 6,918,526 B1 | * | 7/2005 | Huang | 227/130 |

* cited by examiner

*Primary Examiner* — Steven B McAllister
*Assistant Examiner* — Jamil Decker

(57) ABSTRACT

A pressure relief valve for relieving air pressure from an automotive vehicle interior. The pressure relief valve mounts on a valve mounting location that surrounds a body opening and includes flexible interleaved flaps and a securing mechanism. The flaps cover the body opening, with each of the flaps being generally triangular in shape and having an outer end adjacent to the valve mounting location and a pair of sides extending from the outer end inward to an inner corner, with the inner corners meeting to form a peak. The interleaved flaps form a generally pyramidal-shape that angles away from the automotive vehicle interior as the interleaved flaps extend inward from the outer ends toward the peak. The securing mechanism is secured to the radially outer ends of the flaps and to the valve mounting location.

8 Claims, 3 Drawing Sheets

PRESSURE RELIEF VALVE FOR A VEHICLE BODY

BACKGROUND OF INVENTION

The present invention relates generally to a control and pressure relief valve for relieving pressure from an automotive vehicle interior to atmospheric pressure outside the vehicle interior.

Automotive HVAC systems provide cooled or heated pressurized air to automotive vehicle interiors. Typically, pressure relief valves are included in the vehicle body to relieve pressure from within the vehicle interiors during operation of the HVAC system to control air flow in the automotive vehicle interiors and keep the automotive interior pressure and atmospheric pressures substantially balanced. These pressure relief valves also allow for pressure relief from the vehicle interiors when a door, deck lid or the like is closed to reduce the door closure effort. The valves are also designed to keep dirt, water and fumes out of the vehicle interiors by preventing air flow back through the valve into the vehicle interior.

Some pressure relief valves currently in use are sensitive to mounting angle on the vehicle body and may sometimes hang open, allowing water, dust, noise and air intrusion into the vehicle interior. Moreover, many pressure relief valves have flaps that make noise during door closing and rough road events because the pivoting flaps bounce against a plastic frame. In addition, these types of flaps may deteriorate over time, with the edges curling, creating a constant open air pathway into the vehicle interior. One possible solution is to use rubber flaps rather than plastic flaps, but these are more expensive than desirable for many vehicles.

SUMMARY OF INVENTION

An embodiment contemplates a pressure relief valve for relieving air pressure from an automotive vehicle interior to an atmospheric pressure outside the vehicle interior. The pressure relief valve mounts on a valve mounting location that surrounds a body opening having an inlet in fluid communication with the vehicle interior and an outlet in fluid communication with the atmospheric pressure outside the vehicle interior. The pressure relief valve comprises a plurality of flexible interleaved flaps and a securing mechanism. The flaps cover the body opening, with each of the flaps being generally triangular in shape and having a radially outer end configured to be adjacent to the valve mounting location and a pair of sides extending from the radially outer end inward to a radially inner corner, with the radially inner corners of each of the flaps meeting to form a peak when the pressure relief valve is in a closed position. The plurality of interleaved flaps form a generally pyramidal-shape that angles away from the automotive vehicle interior as the interleaved flaps extend inward from the radially outer ends toward the peak. The securing mechanism is secured to the radially outer ends of the flaps and secured to the valve mounting location. The pressure relief valve is operable to prevent air flow into the vehicle interior from atmospheric pressure outside the vehicle interior, and for the flaps to flex to create a central opening to allow air flow from the vehicle interior to atmospheric pressure outside the vehicle interior when the air pressure in the vehicle interior exceeds the atmospheric pressure.

An embodiment contemplates a method of relieving air pressure from an automotive vehicle interior to an atmospheric pressure outside the vehicle interior with a pressure relief valve mounted on a valve mounting location that surrounds a body opening having an inlet in fluid communication with the vehicle interior and an outlet in fluid communication with the atmospheric pressure outside the vehicle interior, the method comprising the steps of: flexing a plurality of flaps away from the vehicle interior to create a central opening between the flaps when the air pressure in the vehicle interior exceeds the atmospheric pressure, with each of the flaps being generally triangular in shape and having a radially outer end secured to the valve mounting location and a pair of sides extending from the radially outer end inward to a radially inner corner adjacent to the central opening; and flexing the plurality of flaps to cause the radially inner corners to meet to form a peak, closing the central opening and preventing air flow into the vehicle interior from atmospheric pressure outside the vehicle interior when the air pressure in the vehicle interior does not exceed the atmospheric pressure, with the plurality of interleaved flaps in a closed position forming a generally pyramidal-shape angling away from the automotive vehicle interior as the interleaved flaps extend inward from the radially outer ends.

An advantage of an embodiment is that the desired one-way air flow through the pressure relief valve is accomplished, while avoiding the use of noisy flaps. Another advantage of an embodiment is that the pressure relief valve can be mounted to the vehicle body at a variety of angles and still perform as desired. Still another advantage of an embodiment is that the pressure relief valve can be modified to accommodate various shapes of body openings.

DETAILED DESCRIPTION

Figure 1:
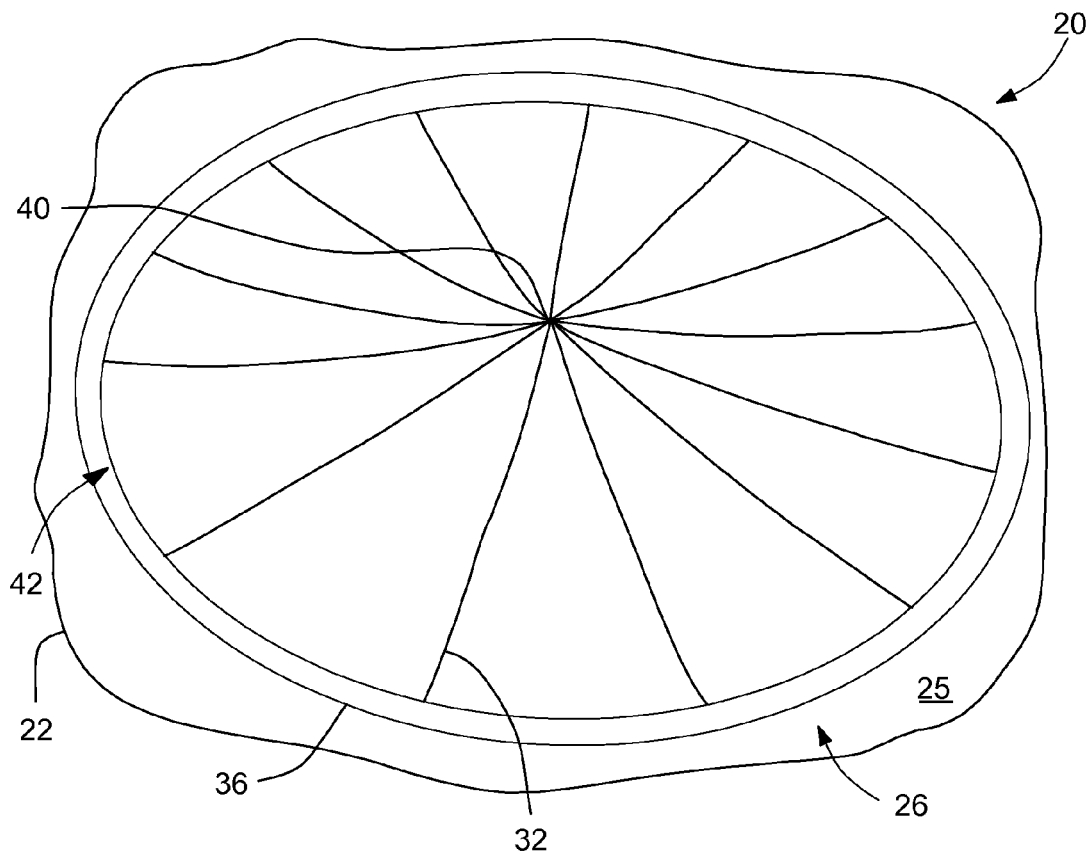
FIG. 1 is a schematic, perspective view of a pressure relief assembly in a closed position.

Referring to FIGS. 1-4, a pressure relief assembly, indicated generally at 20, is shown. A vehicle body structure 22 includes a body opening 24, at a body mounting location 25, on which a pressure relief valve 26 is mounted. The pressure relief valve 26 separates a vehicle cabin side 28 of the valve assembly 20 from an atmospheric (outside vehicle) side 30 of the valve assembly 20. The vehicle cabin side 28 is an inlet side and is in fluid communication with the vehicle interior, and the atmospheric side 30 is a valve outlet side of the pressure relief assembly 20 and is in fluid communication with the atmosphere around the vehicle.

The pressure relief valve 26 includes a series of overlapping (interleaved) flaps 32. Each flap 32 may be generally triangular in shape (as seen best in FIG. 4), with a radially outer end 34 of each flap 32 mounted on the body mounting location 25 so that the entire body opening 24 is covered. The flaps 32 are made of a flexible material that allows the flaps to flex and un-flex for opening and closing of the pressure relief valve 26.

A securing mechanism 36, such as, for example, a frame, may be employed to secure the outer ends 34 to the body structure 22. The frame 36 may be a piece of material that is formed in the general shape of the body opening 24 and large enough to encircle the body opening 24 and attach to the body mounting location 25 (via fasteners, welding or adhesive) in order to secure and seal the radially outer ends 34 of the flaps 32 to the body mounting location 25. The securing mechanism 36 may also be, for example, a bead of adhesive caulk that extends around the body opening 24 and secures and seals the radially outer ends 34 of the flaps 32 to the body mounting location 25.

Figure 2:
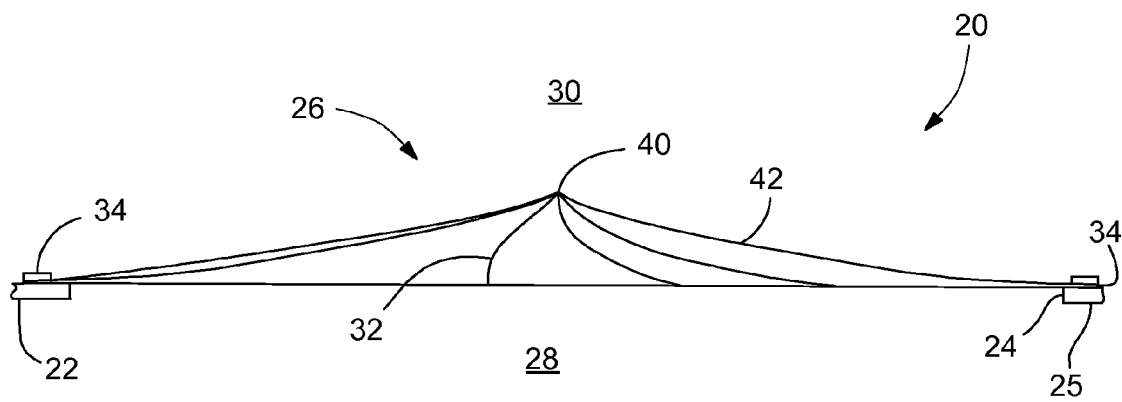
FIG. 2 is a schematic perspective view of a portion of a pressure relief valve in a closed position.
Figure 3:
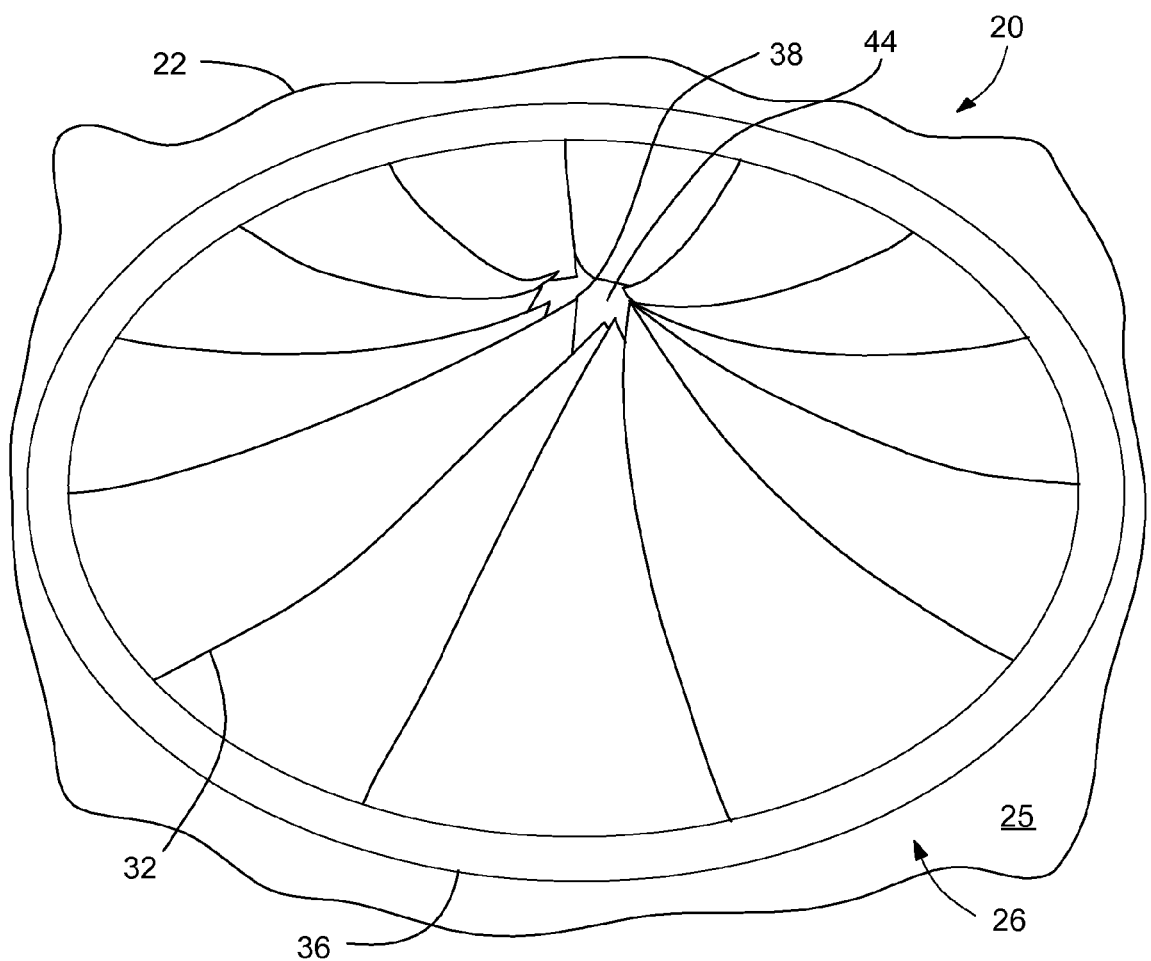
FIG. 3 is a schematic view similar to FIG. 1, but illustrating the pressure relief valve in an open position.
Figure 4:
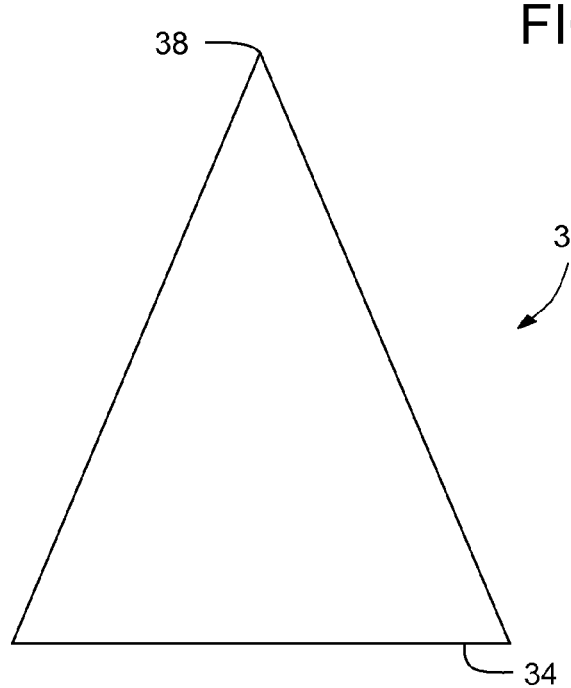
FIG. 4 is a schematic plan view of a flap.

Each flap 32 is located so that its radially inner corner 38 extends upward toward the atmospheric side 30, with the corners 38 forming a peak 40 at the top of a generally conical-shaped or pyramidal-shaped assembly 42 when in a closed position (as best seen in FIG. 2). The slope of the sides of the pyramidal-shaped assembly 42 are sufficient to allow the flaps 32 to bend further toward the atmosphere side but prevent the flaps 32 from bending toward the vehicle cabin side 28 of the pressure relief assembly 20. The terms "generally conical-shape" or "generally pyramidal-shape" as used herein mean that the interleaved flaps 32 of the pressure relief valve 26 do not lie in a plane, but instead angle toward the atmospheric side 30 as they extend inward from the body mounting location 25 toward the peak 40; also, this angle may increase closer to the peak 40.

Each flap 32 may be, for example, triangular with 70 millimeter (mm) width at the radially outer end 34, and 75 mm height (from radially outer end 34 to radially inner corner 38), forming a generally circular pressure relief valve 26 with a diameter at the peripheral edges of about 140 mm. If the pressure relief valve 26 includes sixteen flaps 32, for example, each flap 32 may have 27.5 mm of surface exposed on the atmospheric (outlet) side and 42.5 mm of overlap near the outer end 34 of each flap 32.

Those skilled in the art will appreciate that additional pressure relief assemblies 20 may be mounted to the vehicle body structure 22 at different locations on the vehicle, while remaining within the scope of the present invention.

The operation of the pressure relief assembly 20 will now be discussed. When the air pressure in the vehicle is close to or the same as the atmospheric pressure outside of the vehicle, the pressure relief valve 26 will remain in its closed position (shown in FIGS. 1 and 2). In the closed position, then, there is no opening for dirt, water and fumes to flow through the valve 26 into the vehicle interior.

The stiffness and angle of the flaps 32 are sufficient to prevent any pressure differential—where the pressure at the outlet side is greater than the pressure in the inlet side—to cause the flaps 32 to flex inward and create an opening in the pressure relief valve 26.

During typical vehicle operation with the vehicle windows (not shown) closed and a heating, ventilation and air conditioning (HVAC) system (not shown) operating, the pressure inside the vehicle may increase relative to the atmospheric pressure outside the vehicle. As the pressure differential increases, this pressure differential will cause the flaps 32 to bend further toward the atmospheric side 30 of the body opening 24, creating a central opening 44 (shown in FIG. 3) through which air can flow from the vehicle cabin side 30 to the atmospheric side 30. As the pressure is equalized, the flaps 32 will flex back to their closed positions (see FIGS. 1 and 2). The opening of the pressure relief valve 26 may also occur when a vehicle door (not shown) or hatch (not shown) is closed, in which case the pressure in the vehicle interior may rise quickly. The sudden increase in pressure will flex the flaps 32 outward, allowing the pressure in the vehicle interior to equalize with the atmospheric pressure by allowing air flow through the pressure relief valve 26. Thus, the pressure relief valve 26, in essence, functions as a passive one-way check valve, opening and closing based on the increase in pressure in the vehicle interior.

The amount of pressure differential needed to create an opening for air escape can be adjusted by, for example, changing the stiffness of the flaps or the size of the body opening 24.

Figure 5:
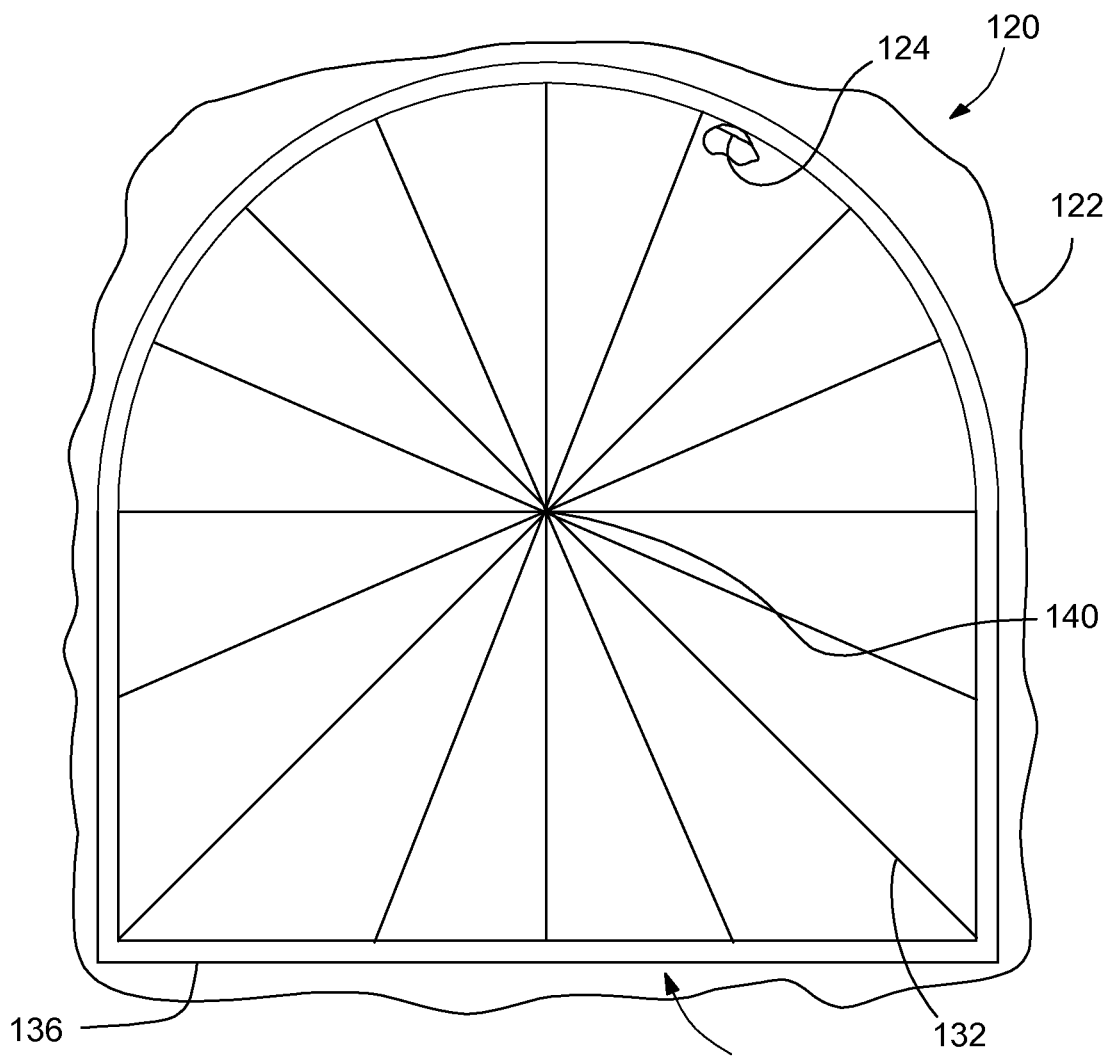
FIG. 5 is a schematic, plan view of a pressure relief assembly according to a second embodiment.
Figure 6:
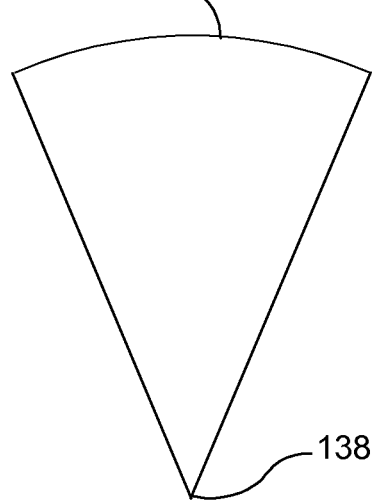
FIG. 6 is a schematic plan view of a flap employed with the second embodiment.
Figure 7:
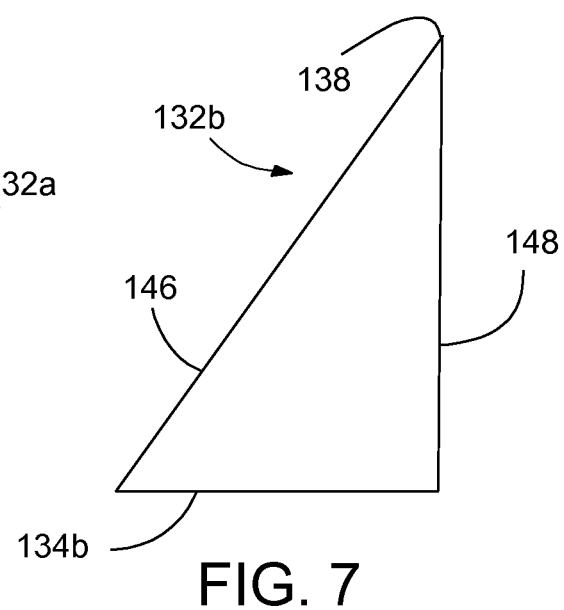
FIG. 7 is a schematic plan view of another flap employed with the second embodiment.

FIGS. 5-7 illustrate a second embodiment. Since this embodiment is similar to the first, similar element numbers will be used for similar elements, but employing 100-series numbers. In this embodiment, the body opening 124 in the vehicle body structure 122 is not circular anymore, thus the pressure relief assembly 120 is changed to accommodate this. Irregular shaped body openings 124 may be needed on some vehicles due to vehicle packaging constraints, and the pressure relief assembly 120 can be shaped to accommodate these constraints while still providing the desired pressure relief. Thus, although only two shapes of pressure relief assemblies are shown in the two embodiments herein, those skilled in the art will appreciate that the pressure relief assembly may be formed in many different shapes to accommodate vehicle packaging requirements.

In this embodiment, individual flaps 132 may have different shapes to accommodate the shape of the body opening 124. For example, FIG. 6 illustrates a generally triangular shape of flap 132a that may be employed in the upper portion of the pressure relief valve 126, with a radially inner corner 138 that extends to the peak 140 of the valve 126 and a curved radially outer end 134a that is secured by a frame 136. FIG. 7 illustrates a generally triangular shape of flap 132b that may be employed in the lower, left portion of the pressure relief valve 126, with a radially inner corner 138 that also extends to the peak 140, but with a radially outer end 134b that is straight and extends at a different angle from each of the two sides 146, 148 of the flap 132. Thus, when the flaps are stated as being "generally triangular" this includes shapes that may be actual triangles, pie shaped flaps, and flaps whose shapes are close to being triangular even if they may have smaller fourth or fifth sides needed to match the shape of the body opening 124.

The operation of the pressure relief valve 126 in this embodiment is essentially the same as in the first embodiment and so will not be discussed further.

While certain embodiments of the present invention have been described in detail, those familiar with the art to which this invention relates will recognize various alternative designs and embodiments for practicing the invention as defined by the following claims.

What is claimed is:

1. A pressure relief valve for relieving air pressure from an automotive vehicle interior to an atmospheric pressure outside the vehicle interior, the pressure relief valve configured to be mounted on a valve mounting location that surrounds a body opening having an inlet in fluid communication with the vehicle interior and an outlet in fluid communication with the atmospheric pressure outside the vehicle interior, the pressure relief valve comprising:

a plurality of flexible interleaved flaps covering the body opening, each of the flaps being generally triangular in shape and having a radially outer end configured to be adjacent to the valve mounting location and a pair of sides extending from the radially outer end inward to a radially inner corner, each of the flaps being flexible along an entire length from the radially outer end to the radially inner corner, the radially inner corners of each of the flaps meeting to form a peak when the pressure relief valve is in a closed position; and the plurality of interleaved flaps forming a generally pyramidal-shape configured to angle away from the automotive vehicle interior as the interleaved flaps extend inward from the radially outer ends toward the peak; and a securing mechanism secured to the radially outer ends of the flaps and configured to be secured in sealing engagement to the valve mounting location;

whereby the pressure relief valve is configured to be operable to prevent air flow into the vehicle interior from atmospheric pressure outside the vehicle interior, and for each of the flaps to flex, along the entire length of the flap from the radially outer end to the radially inner corner, to create a central opening to allow air flow from the vehicle interior to atmospheric pressure outside the vehicle interior when the air pressure in the vehicle interior exceeds the atmospheric pressure.

2. The pressure relief valve of claim 1 wherein each of the flaps is biased toward the valve closed position.

3. The pressure relief valve of claim 1 wherein the securing mechanism is a frame member configured to be mounted to the valve mounting location adjacent to and surrounding the body opening.

4. A pressure relief assembly for relieving air pressure from an automotive vehicle interior to an atmospheric pressure outside the vehicle interior, the pressure relief assembly comprising:

a vehicle body structure including a valve mounting location that surrounds a body opening having an inlet in fluid communication with the vehicle interior and an outlet in fluid communication with the atmospheric pressure outside the vehicle interior;

a pressure relief valve including a plurality of flexible interleaved flaps covering the body opening and a securing mechanism; each of the flaps are generally triangular in shape and have a radially outer end adjacent to the valve mounting location and a pair of sides extending from the radially outer end inward to a radially inner corner, each of the flaps being elastically flexible along the entire length from the radially outer end to the radially inner corner, the radially inner corners of each of the flaps meeting to form a peak when the pressure relief valve is in a closed position, and the plurality of interleaved flaps forming a generally pyramidal-shape configured to angle away from the automotive vehicle interior as the interleaved flaps extend inward from the radially outer ends toward the peak; and a securing mechanism secured to the radially outer ends of the flaps and secured in sealing engagement to the valve mounting location, wherein each of the flaps is configured to elastically flex along the entire length from the radially outer end to the radially inner corner when the air pressure in the vehicle interior is greater than the atmospheric pressure outside the vehicle.

5. The pressure relief assembly of claim 4 wherein the body opening is circular and each of the flaps is pie-shaped.

6. The pressure relief assembly of claim 4 wherein each of the flaps is biased toward the valve closed position.

7. The pressure relief assembly of claim 4 wherein the securing mechanism is a frame member mounted to the valve mounting location adjacent to and surrounding the body opening.

8. A method of relieving air pressure from an automotive vehicle interior to an atmospheric pressure outside the vehicle interior with a pressure relief valve mounted on a valve mounting location that surrounds a body opening having an inlet in fluid communication with the vehicle interior and an outlet in fluid communication with the atmospheric pressure outside the vehicle interior, the method comprising the steps of:

elastically flexing a plurality of flaps, with each of the flaps being generally triangular in shape and having a radially outer end secured to the valve mounting location and a pair of sides extending from the radially outer end inward to a radially inner corner adjacent to the central opening, each of the flaps elastically flexing along the entire length from the radially outer end to the radially inner corner away from the vehicle interior to create a central opening between the flaps when the air pressure in the vehicle interior exceeds the atmospheric pressure; and elastically flexing the plurality of flaps, along the entire length of each flap from the radially outer end to the radially inner corner, to cause the radially inner corners to meet to form a peak, closing the central opening and preventing air flow into the vehicle interior from atmospheric pressure outside the vehicle interior when the air pressure in the vehicle interior does not exceed the atmospheric pressure, with the plurality of interleaved flaps in a closed position forming a generally pyramidal-shape angling away from the automotive vehicle interior as the interleaved flaps extend inward from the radially outer ends.

* * * * *